United States Patent [19]

Kim

[11] Patent Number: 5,376,324
[45] Date of Patent: Dec. 27, 1994

[54] FOOD STORING CONTAINER AND MANUFACTURING METHOD THEREOF

[75] Inventor: Hyung K. Kim, Suwoon-city, Rep. of Korea

[73] Assignee: Samsung Electronics Co., Ltd., Suwon City, Rep. of Korea

[21] Appl. No.: 942,223

[22] Filed: Sep. 9, 1992

[30] Foreign Application Priority Data

Sep. 9, 1991 [KR] Rep. of Korea .............. 91-15717

[51] Int. Cl.⁵ ........................................... B29C 45/14
[52] U.S. Cl. ............................ 264/241; 264/131; 264/259; 264/316; 264/511; 428/34.5; 428/36.4
[58] Field of Search ............... 428/34.5, 36.4; 264/509, 131, 259, 241, 316, 511

[56] References Cited

U.S. PATENT DOCUMENTS 5,043,130  8/1991  Fujio .................................. 264/509

FOREIGN PATENT DOCUMENTS 62-263013  11/1967  Japan ................................ 264/316
1140485    3/1988  Japan .

OTHER PUBLICATIONS

John C. White, "Chemical Patent Practice", pp. 113, 114, 128 (1987).

*Primary Examiner*—James J. Seidleck
*Assistant Examiner*—Patrick R. Delaney
*Attorney, Agent, or Firm*—Burns, Doane, Swecker & Mathis

[57] ABSTRACT

The invention relates to a food storing container and a method thereof, said container is formed with thermoplastic synthetic resin material and a bio-ceramic material naturally radiating extreme infrared ray is adhered to the inside surrounding surface thereof.

Said bio-ceramic material is adhered to on the tape of polyester material in high density to be supplied into the surface of the inside molder as a roll type before an injection molding of a container and then the injection solution is filled thereon to mold a predetermined container, whereby the bio-ceramic material is uniformly distributed in the container, and also the container is constructed by a method of adhering the bio-ceramic material to the polyester material so that the firmness, the preservation and the ease-of-manufacturing thereof becomes high.

8 Claims, 3 Drawing Sheets

FOOD STORING CONTAINER AND MANUFACTURING METHOD THEREOF

BACKGROUND OF THE INVENTION

The invention relates to a food storing container and method of making same, said container being used for storing food at either low or high temperature for a long period of time.

PRIOR ART

A common method to store food in a cool or a warm state is to form artificially a predetermined air-conditioned space.

For example, a wall of insulation material can form an insulating chamber isolated from the exterior. An air-conditioner provides low temperature or warm temperature in this chamber so that the food gets the expected effect. Examples of such a storing apparatus are a heating apparatus storing food in a warm state, a refrigerator for the extended storage of food in a cold state, the food being of a type which easily degenerates at the normal temperature or loses freshness.

Such storing apparatuses circulate the inside air of a storing chamber even when the smell from deteriorating food in the storing space makes a user feel bad, and also is unsanitary. In case of storing for a longer period of time, the inside air of a storing space becomes dry. The moisture included in uncovered food thus evaporates and reduces the freshness thereof, or the heat of food is exchanged with that of the air-conditioned air so that the air-conditioned air must be continuously supplied, whereby a large consumption of electric power for the air-conditioning is caused. Thus, these apparatuses are uneconomical. Also, the storage of food is limited if an air-conditioning is not achieved. Even if air-conditioning is provided, the storage of food is limited.

Considering the above restrictions, it is realistic that food storage will be limited even under an air-conditioning circumstance. But it is very desirable to keep food for a longer period of time even in the existing air-conditioning circumstance. Accordingly, various special food containers have been developed and placed in use recently. Especially, such a container uses materials for promoting a preservation, deodorization or freshness-maintenance of food. For a good example, bio-ceramic material including an extreme infrared ray has been developed for improving the storage of food. The container using such ceramic material is generally made of synthetic resin material by a projection molding operation after thoroughly mixing the ceramic material in a particulate state with the synthetic resin material.

But this container contains an extremely small quantity of ceramic material compared with the amount of synthetic resin material, whereby the expected food storing effect cannot be achieved.

In other words, the ceramic material is evenly dispersed in all walls of the container so that only a minimum part of the material exists in low density on the surfaces of the container, and thus performs little purification of circulating surrounding air.

The ceramic material buried in the walls of the container is unable to contact the inside air of an air-conditioning place, whereby the purification action of that buried material cannot be used. The injection molder and the inside of a manufacturing mold are easily damaged by the hardness of a ceramic material so that the quantity thereof which can be used is limited.

Accordingly, one known storing container is manufactured without a ceramic material but rather is placed in a storing space, wherein an infrared ray radiating plate is set in the storing space for a purification and a storing ability. But for this purpose, a plate-setting place must be provided in the storing space, whereby the available volume of the storing space is exceedingly decreased. Therefore, the user cannot accomplish the expected object. Accordingly, noticing the point that the food storage chambers are air tight, an inside sheet for a refrigerator is disclosed in Japanese Utility Model Laid-Open 89-140485. This inside sheet is designed by adhering a metal foil to a synthetic resin film with a glue including a ceramic powder. The ceramic powder has a good radiation characteristic for infrared rays. This inside sheet is installed at all walls of a storing chamber in a refrigerator.

Consequently, the cost of manufacturing a refrigerator rises and the effect of infrared rays occurs upon even things irrelevant to a food storing term so that this method has been avoided. In addition to that, this Utility Model has another problem that the infrared rays do not affect the food placed in the center of a large quantity of surrounding food.

It is the object of the invention to produce a manufacturing method of a food storing container for selectively storing food and for maximizing the effect of a bio-ceramic material thereof.

It is another object of the invention to produce a food storing container of increasing purification and preservation by bio-ceramic material stuck to the inside wall surface inside of a container, and a manufacturing method thereof.

It is a further object of the invention to produce a food storing container for maximizing the application of an air-tight chamber and selectively keeping food for a longer term, and a manufacturing method thereof.

It is a still further object of the invention to produce a food storing container which is easily constructed and capable of increasing the purification characteristics of a food storing container and a manufacturing method thereof.

SUMMARY OF THE INVENTION

Such objects of the invention are achieved by providing a food storing container of bio-ceramic material, said storing container comprising a body of synthetic resin material and bio-ceramic material adhered to the inner wall surface of this body, said bio-ceramic material naturally radiates infrared rays.

To manufacture the container, bio-ceramic material powder particles are applied to a thermostable high compact tape of polyester material to form therewith a tape unit. The tape unit is positioned in a mold cavity. Synthetic resin is injected into the cavity, causing the particles to separate from the tape and become adhered to the synthetic resin.

The particles are applied to the tape unit. The tape unit is positioned by using a high strength glue. A roll of the tape is supplied to the injection molder.

When the container is manufactured in such a manner, the inside surface of the container is kept smooth by the presence of the tape in the mold. The bio-ceramic material is uniformly distributed along the inner surface whereby the invention has an effect to continue keeping the food stored inside of the container with a uniform preservation.

DETAILED DESCRIPTION OF THE INVENTION

Figure 1:
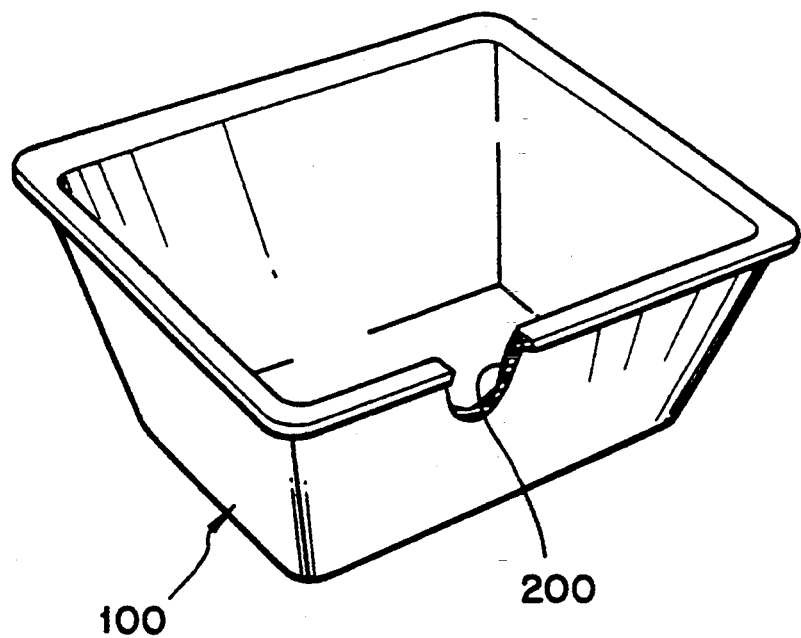
FIG. 1 is a perspective view of a food storing container according to the invention with a portion broken away.
Figure 2:
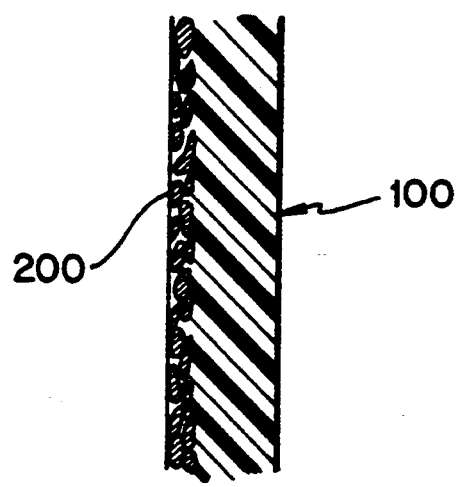
FIG. 2 is a sectional view through a wall of a food storing container according to the invention.

As shown in FIG. 1, the food storing container according to the invention comprises a receptacle box 100 made of thermoplastic synthetic resin materials. This vessel provides a storing space for receiving food.

The inside surrounding wall surface of the vessel 100 adheres to bio-ceramic material 200 as one unit. The bio-ceramic material will help the self-purification and the activation of cells of food stored to continue to maintain the food in a natural state. Such food storing container will be manufactured through the proper injection molding process.

Figure 3:
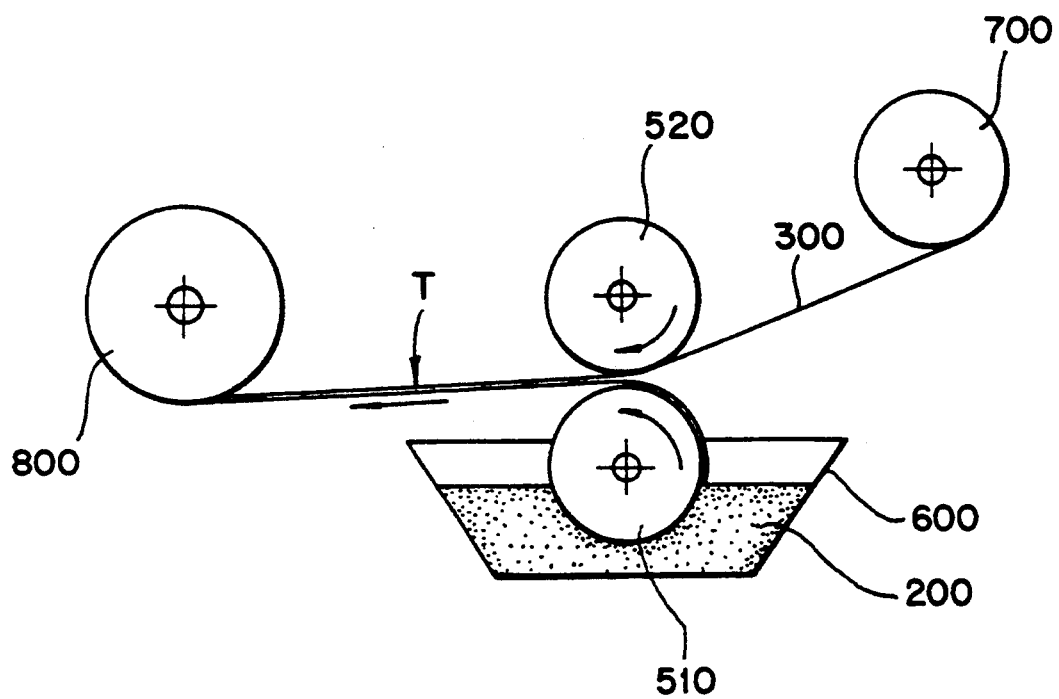
FIG. 3 is a view illustrating the process of manufacturing a tape unit for use in making a container according to the invention.
Figure 4:
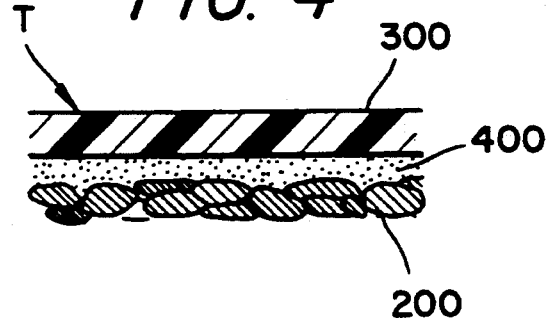
FIG. 4 is a sectional view through the tape unit.
Figure 5:
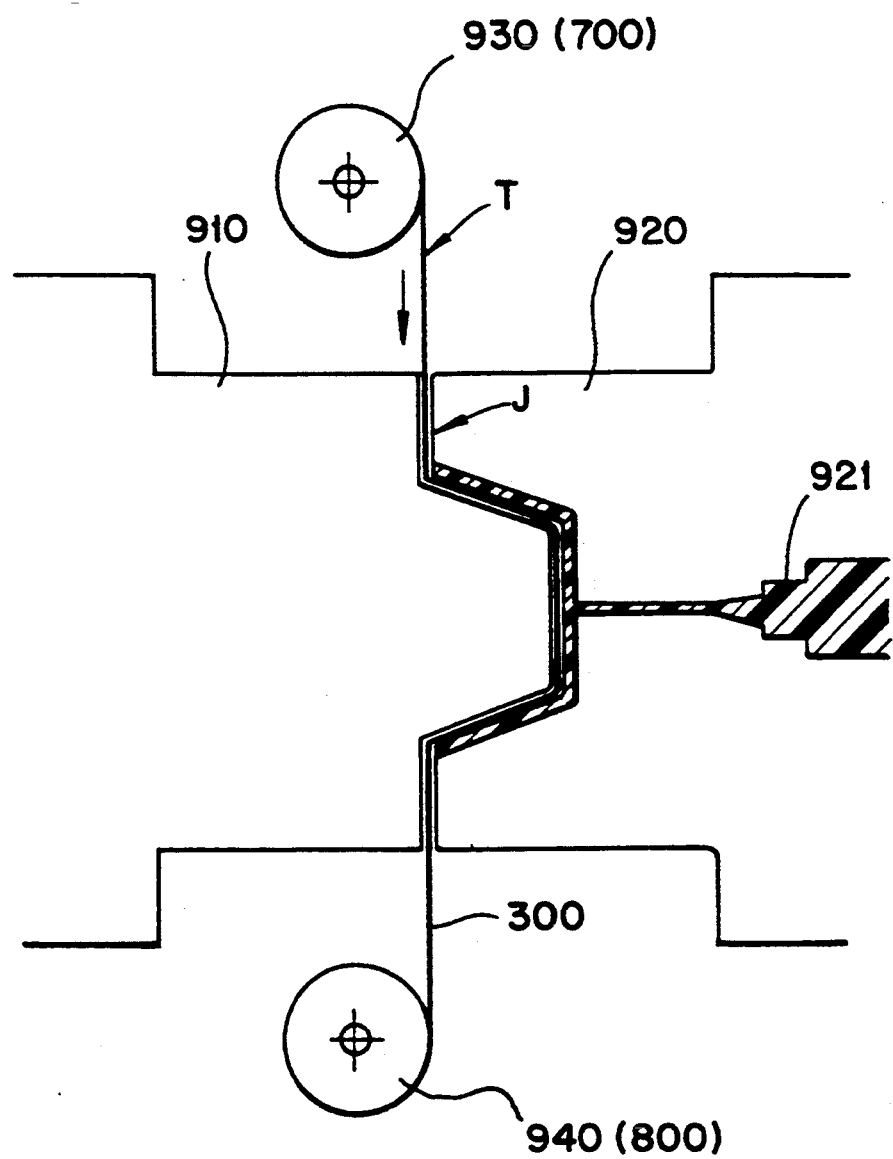
FIG. 5 is a view of the tape unit in use with an injection mold for making containers according to the invention.

FIG. 3, FIG. 4 and FIG. 5 show the manufacturing method of the food storing container in detail.

The bio-ceramic material 200 is compactly adhered to on a thermostable tape 300 made of polyester materials by a thin layer 400 of a high strength glue component between them. The tape 300 is supplied on a roll to perform the manufacturing process.

A micro-particle ceramic material is properly mixed with the glue and an additive to form a high viscosity liquid, and then this liquid phase of bio-ceramic material is placed in the storing container 600 at the proper level, wherein one adhesion roller 510 of a pair of adhesion rollers 510, 520 rotating together with each other in engagement by separate driving means is partly immersed. If the tape 300 provided from a supplying roller 700 is passed between these adhesion rollers 510, 520, the liquid phase of bio-ceramic material will be moved to adhere to one face of the tape 300 from the surrounding wall of the immersed adhesion roller 510 as shown in FIG. 3. At this time, said tape 300 will become covered by a specific glue forming the thin layer.

The unit tape T manufactured like described above is wound on a receiving roller 800 into a roll to be supplied into an injection molder in an injection molding process which will be described below.

FIG. 5 illustrates the injection molding process of a food storing container in detail.

The injection molder comprises male and female mold sections 910, 920, and the female section 920 includes a nozzle 921 for injecting the melted synthetic resin material. The previously described roller 800 now constitutes a supplying roller 930 carrying the tape unit T with the bio-ceramic material and is installed at the upper part of the junction J of the mold sections 910, 920. Provided at the lower part of the junction J, is a receiving roller 940 for collecting only the tape 300 once that tape has separated from the bio-ceramic material 200. The tape unit T extends through a mold cavity disposed at the junction J.

The bio-ceramic material 200 on the tape unit T will face the female mold section 920 and then if the melted synthetic resin material is injected through the nozzle 921, the melting solution is filled in the mold cavity to form the container 100. At this time, the glue component 400 becomes separated from the tape by high heat and simultaneously melts, whereby the melted glue component adheres the bio-ceramic material 200 to the synthetic resin material. If the mold sections are disconnected, the tape 300 will be automatically detached from the bio-ceramic material 200.

When the bio-ceramic material 200 combines with the melt 921, the high heat thereof makes the thin layer 400 separate, whereby the tape 300 becomes detached from the bio-ceramic material 200. At this point, the bio-ceramic material 200 spreads itself into the synthetic resin to be adhered thereto. When the mold sections 910, 920 are separated, at the same time, the tape 300 is completely detached from the bio-ceramic material. In this condition, the receiving roller 940 rotates to collect the used tape 300 by a separate driving apparatus, whereupon, a portion of the tape unit T containing the bio-ceramic material 200 is unwound from the roller 930 and becomes situated across the junction J in preparation for the next molding process.

The effect of the invention will be described with referring to FIG. 1 to FIG. 5.

The invention does not mix the bio-ceramic material with the synthetic resin material as a main component throughout the entire container. Rather, the bio-ceramic material is adhered to and buried in the inner wall surface of a container so that the molding process can be simply performed without any damage to the injection molder by the very hard bio-ceramic material. The prior art practice of thoroughly mixing ceramic material powder with synthetic resin material to mold a container does not achieve the expected storing effect due to only a small quantity of ceramic material included in the container, unlike the invention which uses a larger quantity. Also in the prior art, the ceramic material resembles impurities in the synthetic resin material because of a small quantity of ceramic material as compared with the synthetic resin, and also the inside surface of the container is not smooth. But the storing container according to the invention has a smooth inside surface due to uniform bio-ceramic material.

Additionally, the invention extends the life cycle of an injection molder and reduces the depreciation price to reduce the manufacturing cost simultaneous with raising the productivity. Due to the bio-ceramic material being embedded in the inside surface high density of the bio-ceramic material, whereby it has good characteristics to increase the preservation thereof by maintaining the freshness of food as well as the self-purification. The bio-ceramic material can comprise an extreme infrared radiation ceramic (also known as a far infrared radiation ceramic) such as alumina and zirconia, emitting a radiation wavelength preferably in the range of about 4–10 μm.

What is claimed is:

1. A method of manufacturing a food storage container, comprising the steps of:
   applying, to one side of a tape, particles of bio-ceramic material capable of emitting infrared radiation, to form a tape unit with said tape,
   positioning said tape unit within a mold cavity, injecting a molten synthetic resin into said mold cavity so that said bio-ceramic particles become separated from said tape and become adhered to said synthetic resin, while said resin assumes a shape of a container as defined by said mold cavity, and removing said container together with said bio-ceramic particles from said mold cavity and separating said tape from said container.

2. A method according to claim 1, wherein said positioning step is performed such that said bio-ceramic particles are situated at a side of said mold cavity corresponding to an inner surface of said container, wherein said particles become adhered in a high density relationship along said inner surface.

3. A method according to claim 2, wherein said mold cavity is defined by male and female mold sections, said bio-ceramic material being arranged to face said female mold section.

4. A method according to claim 1, wherein said applying step includes providing a mixture of said particles and a flowable glue material, and depositing a layer of said mixture on said side of said tape.

5. A method according to claim 4, wherein said applying step further comprises advancing said tape between a pair of rollers, and transferring said mixture onto a surface of one of said rollers so that said transferred mixture adheres to said one side of said tape when said tape passes between said rollers.

6. A method according to claim 4 including unwinding said tape unit from a supply roll.

7. A method according to claim 6, wherein said supply roll is arranged externally adjacent one side of said mold cavity, and a receiving roll is arranged externally adjacent an opposite side of said mold cavity, said tape unit extends from said supply roll to said receiving roll during said positioning step, said tape unit being wound upon said receiving roll at the end of each molding operation.

8. A method according to claim 4, wherein said injecting step includes causing said glue material to become separated from said tape such that said glue material adheres said particles to said synthetic resin.

* * * * *